July 7, 1936. L. A. LEPPKE 2,046,879
CONTAINER OPENER
Filed Jan. 11, 1936
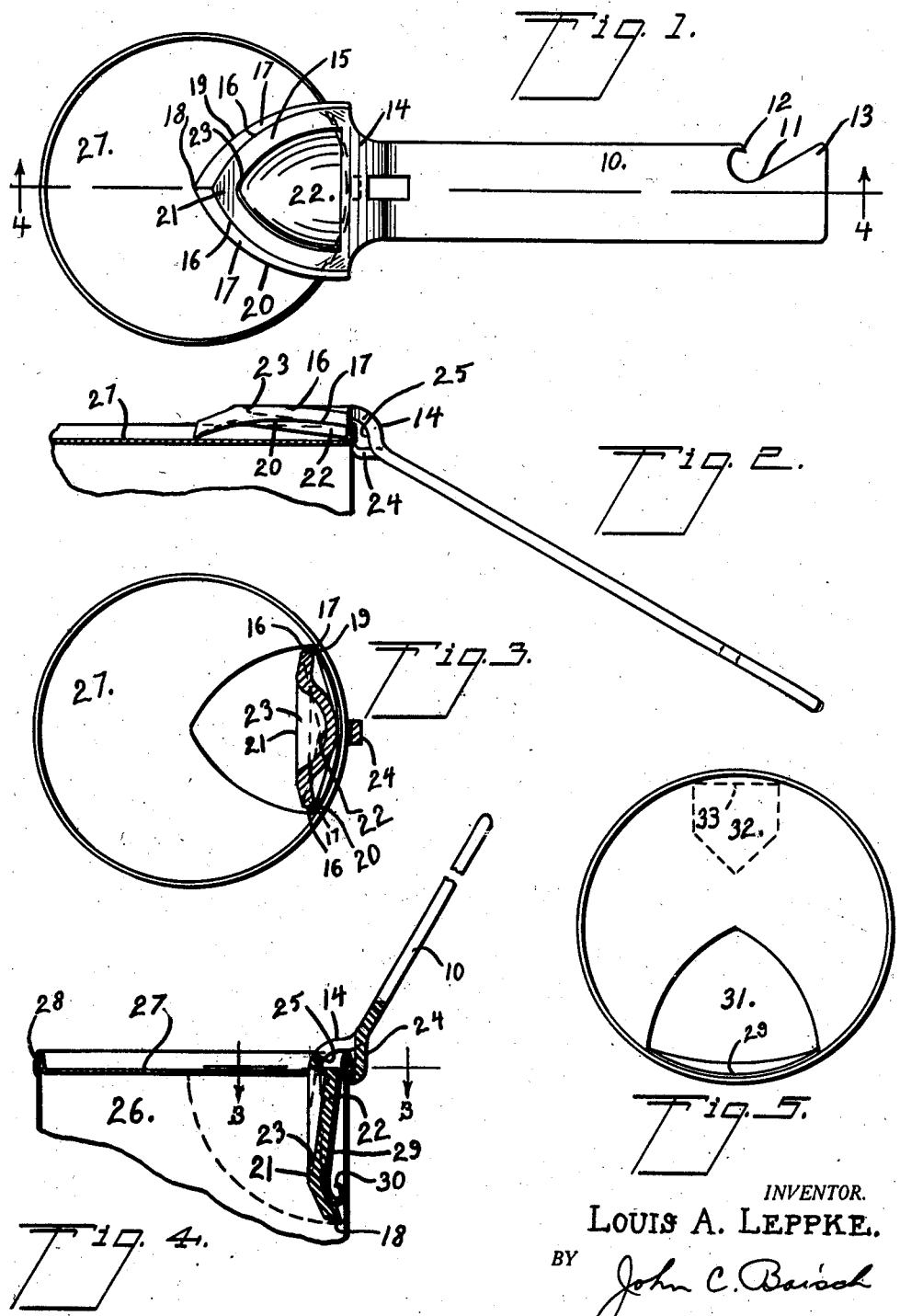
INVENTOR.
LOUIS A. LEPPKE.
BY John C. Barsch
ATTORNEY.

Patented July 7, 1936

2,046,879

UNITED STATES PATENT OFFICE 2,046,879

CONTAINER OPENER

Louis A. Leppke, Omaha, Nebr.

Application January 11, 1936, Serial No. 58,704

6 Claims. (Cl. 164—119)

This invention relates in general to container opening devices and more particularly to a punch opener for producing a substantial opening in containers having projecting end seams or joints.

The principal object of the invention is the provision of a container opener having an enlarged cutting blade which at one stroke or turning movement cuts a filled container and quickly produces a complete and relatively large pouring opening in a wall of a container through which the contents may be readily dispensed, the opening, when fully cut, being triangular in shape with arcual sides, the rim side conforming substantially to the adjacent arc of the container rim, thereby providing an opening particularly adapted to fit the mouth of the consumer so that the contents of the container may be drunk therefrom without same spilling at the ends of said rim side, said opening also being adapted to permit air to enter the container as the contents thereof are exhausted therefrom.

Another important object of the invention is to provide a container opening punch or cutter adapted to work on the lever principle and which employs a projection of a container, for example, the end seam, as a fulcrum or pivot point about which the cutter may be rocked into opening position in a single arcuate movement.

Still another object of the invention is the provision of such an opener, which, because of its enlarged cutting head construction, lends itself exceptionally well to the quick opening of containers filled with effervescent liquids such as beer, where a quick and adequate opening will prevent ebullition and spilling of the contents.

A still further object of the invention is the provision of such a rocker punch whose operating parts are all adapted to be formed out of a single piece of steel or other suitable material in a few simple operations, and which, because of its simplicity of construction, can be produced inexpensively and automatically with a view to supplying the public with an efficient opening tool at small cost.

Numerous other objects and advantages of the invention will be apparent as it is better understood from the following detailed description, taken in connection with the accompanying drawing wherein:

Figure 1 is a plan view of the opener and container top, showing the opener pivotally positioned upon an end seam ready to start the cutting operation.

Figure 2 is an elevational view of the opener and a container top, with parts of the can broken away and in section, showing the opener pivotally positioned upon an end seam ready to start the cutting operation.

Figure 3 is a plan view of the container top and showing in section, taken on line 3—3 of Figure 4, the cutting head or blade in the finished cutting position.

Figure 4 is a sectional view of the opener and container top, taken on line 4—4 of Figure 1, showing the opener pivotally positioned upon an end seam, said opener being in the finished cutting position.

Figure 5 is a plan view of a container top showing an opening cut by my opener, and showing also, in dotted lines, an opening cut by other types of openers.

Referring more particularly to the drawing the preferred embodiment of my opener is formed from a single plate of tool steel or other suitable material. It comprises a handle 10, of substantially rectangular configuration, and of a thickness and width which insure sufficient strength and weight without superfluous bulk. The handle is preferably of a length which is in excess of the width of the average adult person's hand, and the edges and corners thereof are rounded or smoothed off to eliminate sharp edges and corners which might injure the hand of the user.

Adjacent the free end of the handle an elongated notch 11 is provided, said notch increasing in depth forwardly and being rounded at its forward end. A pointed projection 12 is provided at the forward outer end of the notch, said projection being adapted to hook under the lower edge of a crown cap or like closure for removing same from beverage containers or the like. The edges of the notch are also rounded to eliminate sharp edges which might injure the hand of the user. In the removal of closures of the crown type from bottles by means of the projection 12, rounded point 13 of the handle serves as a fulcrum and rests on the top of said closures.

The end of the handle opposite the free end is provided with an upwardly and forwardly curved portion 14 that terminates in an enlarged blade 15, said blade being widest at its base where it joins the handle and sides 16 and 17 respectively converge arcually toward a sharp pointed apex 18, said sides being beveled upwardly and inwardly, the lower edges 19 and 20 of the respective sides are sharpened cutting edges.

The under surface of the body of the blade 15 is generally concave with its forward end 21 inclined downwardly. A longitudinally convex downwardly extending projection 22 is formed in the blade, deepest and widest at its base which is adjacent to and substantially parallel with the base of the blade. The projection 22 tapers arcually forward, becoming shallower until it merges with the body of the blade at its apex 23.

A seam engaging hook 24 is formed out of the central portion of the handle adjacent the base of the blade, said hook being bent at an obtuse angle to the handle below the curved portion 14 and the free end of said hook is turned upwardly and is pointed to more securely hook the lower edge of an end seam of a container. A container seam receiving recess 25 is thus formed beneath the upwardly and forwardly rounded portion 14 of the handle and is defined by said portion 14, the base of the projection 22 and the hook 24.

To exemplify a preferred application of the opener, Figures 1, 2, 3 and 4 illustrate a well known type of container which may be opened by means of the cutter punch or opener. This container comprises a body 26 and a top end 27 secured to the body in any suitable manner, as by a double seam 28, which constitutes the top rim or joint of the container. The rim may assume any other suitable form, as long as it projects beyond the horizontal plane of the top end 27 and beyond the cylindrical plane of the body 26, so as to provide a fulcrum for the pivot recess 25, and an engaging projection or purchase for the hook 24.

To open a container, the opener is grasped by its handle 10 and positioned, as shown in Figures 1 and 2, with the point of the blade engaging the top end 27 of the container, and with the sharp point of the hook 24 engaging the bottom edge of the seam. The opener is then rocked upward and forward pivotally about the container rim, both the handle and the blade describing an arcuate path of movement, the former an upward movement and the latter a downward movement, the while the sharp cutter point 18 of the blade begins the cutting or punching operation. Continued rocking movement brings the sharp cutting edges 19 and 20 into operation and brings the blade to the finished cutting position shown in Figures 3 and 4, where the cut tongue portion 29 of the top container wall is shown deflected inwardly and outwardly under the cutting and pressure force of the blade, the end 30 of the tongue 29 being only slightly curled. The blade cuts the top wall clear to the rim of the container.

At the beginning of the cutting operation the downturned portion 21 of the blade makes the initial cut which provides an immediate opening for the escape of gas, which is desirable in the case of containers filled with beer or other contents which forms gases.

It will be noted that the opening made by the blade, while triangular in shape, has edges that are arcuate, the side along the rim of the container being arcuate in shape as well as the other sides thereof, the metal of the tongue 29 being pressed arcuately outward by the projection 22 so that it conforms substantially to the arcual curvature of the adjacent portion of the rim.

An opening is thus provided that is relatively wide adjacent the rim and converges gradually toward a point inwardly of said rim, said opening being particularly suitable for fitting the mouth of a person drinking liquid directly from the container through the opening therein. Due to the arcuate shape of the sides of the opening there is substantially no danger of the liquid contents of said container spilling around the corners of the mouth of the consumer even though the opening may be very large. The opening provided by my opener is also adapted to permit air to enter the container while the contents thereof is being drunk therethrough.

The advantages of the present opener are readily seen by reference to Figure 5 which shows an opening 31 made by said opener, and an opening 32, shown by dotted lines, made by openers of well known types. Particular attention is called to the rim side of the opening made by my opener, said side being arcual in shape and conforms substantially to the curvature of the adjacent portion of the rim making drinking therefrom natural and easy.

The rim side 33 of the opening made by other types of openers is chordal, making drinking therefrom much more difficult than from an opening made by my opener. In drinking from opening 32 there is constant danger that the liquid in the container will escape at the ends of side 33 and will spill onto the clothing of the person drinking therefrom, thereby soiling said clothing. As the size of opening 32 is increased the danger of the liquid contents of the container spilling at the ends of side 33 greatly increases, as contrasted with an opening made by my opener.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

Having thus described my invention what I claim is:

1. A device for producing a dispensing opening in an end wall of a liquid container having projecting end seams, comprising a one-piece metal plate, one end of said plate being formed into a handle, said handle having an upwardly and forwardly curved portion terminating in a cutting blade, wide at its base where it joins the handle and having sides that converge arcuately forward to a sharp pointed apex, the lower edges of said sides being sharp cutting edges, the under side of the body of the blade being generally concave and a portion of the forward end of said blade being turned downwardly at an obtuse angle thereto, a longitudinally convex projection on the under side of the blade, widest and deepest at its base which is adjacent to and substantially parallel with the base of the blade, said projection tapering forwardly and becoming shallower toward an apex where it merges with the body of the blade, and a hook extending at an obtuse angle to the handle beneath the curved portion thereof, said hook terminating in a relatively sharp point adapted to engage the under edge seam of a container, the base of the projection, the rounded portion of the handle and the hook defining a recess adapted to receive the end seam of said container.

2. A device for producing a dispensing opening in an end wall of a liquid container having projecting end seams, comprising a one-piece metal plate, one end of said plate being formed into a handle, said handle having an upwardly and forwardly curved portion terminating in a cutting blade, relatively wide at its base where it joins the handle and having sides that converge forwardly to a sharp pointed apex, the lower edges of said sides being sharp cutting edges, the under side of the body of the blade being generally concave and a portion of the forward end of said blade being turned downwardly, a longitudinally convex projection on the under side of the blade, widest and deepest at its base which is adjacent to and substantially parallel with the base of the blade, said projection tapering forwardly and becoming shallower toward an apex where it merges with the body of the blade, and fulcrum means beneath the upwardly and forwardly curved portion of the handle adapted to engage the under edge of a container end seam.

3. A device for producing a dispensing opening in an end wall of a liquid container having projecting end seams, comprising a metal plate, one end of said plate being formed into a handle and the other end being formed into a cutting blade, fulcrum means adapted to engage the under edge of a container end seam, and means on one face of the blade adapted to press the metal cut by the blade arcuately against the cylindrical wall of the container, adjacent the rim of the end wall being cut, in substantial conformity with the curvature of the side of the container and said rim, said blade being adapted to cut the end wall adjacent the lateral sides of the last mentioned means.

4. A device for producing a dispensing opening in an end wall of a liquid container having projecting end seams, comprising a one-piece metal plate, one end of said plate being formed into a handle, said handle having an upwardly and forwardly curved portion terminating in a cutting blade enlarged at its base where it joins the handle and having sides that converge forwardly to a sharp pointed apex, the lower edges of said sides being sharp cutting edges, the under side of the body of the blade being generally concave, a longitudinally convex projection on the under side of the blade, widest and highest at its base which is adjacent to and substantially parallel with the base of the blade, said projection tapering forwardly and becoming shallower toward the apex where it merges with the body of the blade, and fulcrum means beneath the upwardly and forwardly curved portion of the handle adapted to engage the under edge of a container rim.

5. A device for producing a dispensing opening in an end wall of a liquid container having projecting end seams, comprising a one-piece metal plate, one end of said plate being formed into a handle terminating in a cutting blade enlarged at its base where it joins the handle and having sides that converge forwardly to an apex, the lower edges of said sides being sharp cutting edges, the under side of the body of the blade being generally concave, a longitudinally convex projection on the under side of the blade, widest and highest at its base which is adjacent to and substantially parallel with the base of the blade, said projection tapering forwardly and becoming shallower toward the apex until it merges with the body of the blade, and fulcrum means adapted to engage the under edge of a container end seam whereby the device may be operatively rocked.

6. A device for producing a dispensing opening in an end wall of a container having projecting end seams, comprising a metal plate, one end of said plate being formed into a handle and the other end formed into a cutting blade adapted to cut the end wall of a container to the rim thereof, fulcrum means adapted to engage the under edge of a container end seam, and means on one face of the blade adapted to press the metal cut by the blade arcuately against the upper portion of the side of the container adjacent the rim in substantial conformity with the curvature of said side and the rim.

LOUIS A. LEPPKE.